United States Patent
Trapp et al.

(10) Patent No.: US 6,676,008 B1
(45) Date of Patent: Jan. 13, 2004

(54) FRICTION STIR WELDING OF CORNER CONFIGURATIONS

(75) Inventors: Timothy J. Trapp, Upper Arlington, OH (US); Timothy Stotler, Perry Township, OH (US); Mathew Skilliter, Upper Arlington, OH (US)

(73) Assignee: Edison Welding Institute, Columbus, OH (US)

( * ) Notice: Subject to any disclaimer, the term of this patent is extended or adjusted under 35 U.S.C. 154(b) by 64 days.

(21) Appl. No.: 10/135,259

(22) Filed: Apr. 30, 2002

(51) Int. Cl.$^7$ .............................................. B23K 20/12
(52) U.S. Cl. ..................................... 228/112.1; 228/2.1
(58) Field of Search ............................. 228/49.4, 112.1, 228/2.1, 44.3, 49.1; 428/544, 615

(56) References Cited

U.S. PATENT DOCUMENTS

| | | | |
|---|---|---|---|
| 5,460,317 A | 10/1995 | Thomas et al. | 228/112.1 |
| 5,611,479 A | 3/1997 | Rosen | 228/112.1 |
| 5,697,544 A | 12/1997 | Wykes | 228/2.1 |
| 5,718,366 A | 2/1998 | Colligan | 228/112.1 |
| 5,813,592 A * | 9/1998 | Midling et al. | |
| 5,893,507 A | 4/1999 | Ding et al. | 228/2.1 |
| 6,029,879 A | 2/2000 | Cocks | 228/2.1 |
| 6,053,391 A | 4/2000 | Heideman et al. | 228/2.1 |
| 6,325,273 B1 * | 12/2001 | Boon et al. | |
| 6,510,975 B2 * | 1/2003 | Enomoto | |
| 2002/0011509 A1 * | 1/2002 | Nelson et al. | |
| 2002/0011510 A1 * | 1/2002 | Enomoto et al. | |
| 2002/0014516 A1 * | 2/2002 | Nelson et al. | |
| 2002/0190100 A1 * | 12/2002 | Duncan, Jr. | |
| 2003/0019913 A1 * | 1/2003 | Ezumi et al. | |

FOREIGN PATENT DOCUMENTS

| | | | | |
|---|---|---|---|---|
| GB | 2306366 A | * | 5/1997 | |
| JP | 410249551 A | * | 9/1998 | |
| JP | 02000246465 A | * | 2/1999 | |
| JP | 411320128 A | * | 11/1999 | |
| JP | 2000153374 A | * | 6/2000 | |
| JP | 02001225179 A | * | 8/2001 | |
| JP | 2001237621 A | * | 8/2001 | |
| JP | 02001246482 A | * | 9/2001 | |
| JP | 02001321965 A | * | 11/2001 | |
| JP | 02002192357 A | * | 7/2002 | |
| JP | 2002224859 A | * | 8/2002 | |

* cited by examiner

Primary Examiner—Kiley Stoner

(57) ABSTRACT

A radiused corner support plate is used to form a corner void when making L- and T-corner welds that are filled with plasticized work piece material during friction stir welding to form a filleted corner weld. An improved friction stir welding tool uses either disrupting features such as crossed rectangular grooves in the distal tip end or a curved tip region or both to improve plasticized work piece material flow below the distal end and in the region of the fillet.

26 Claims, 3 Drawing Sheets

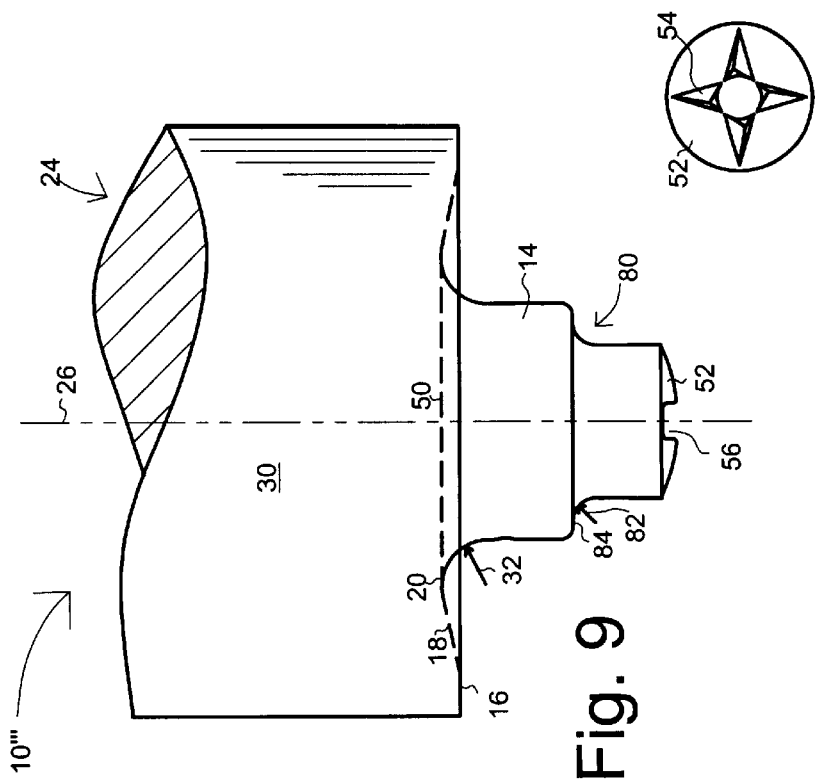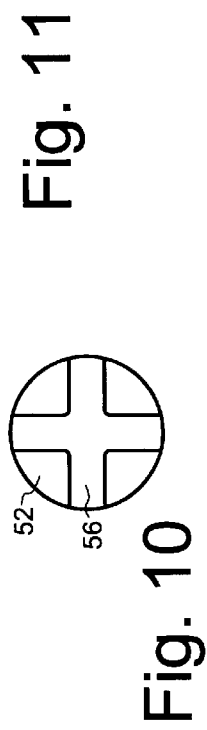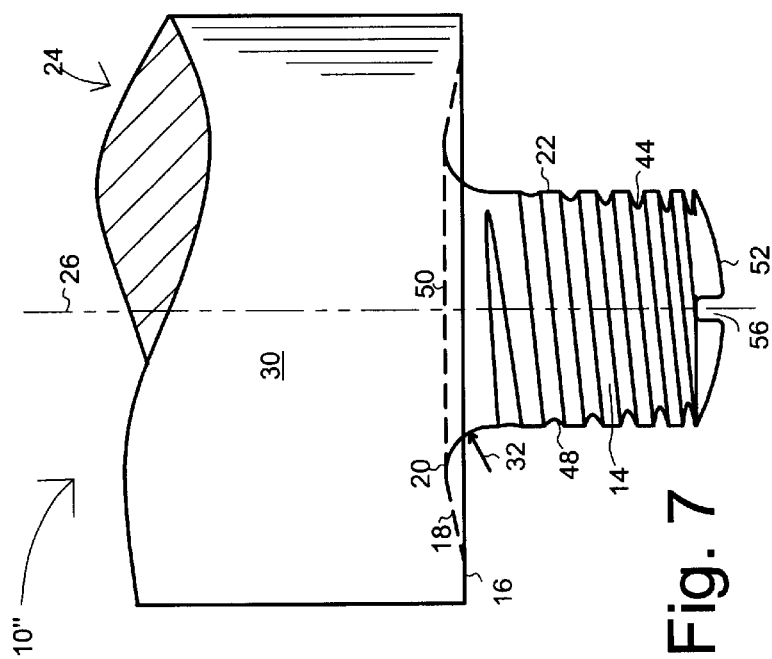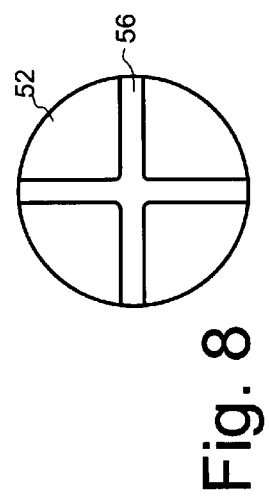

US 6,676,008 B1

FRICTION STIR WELDING OF CORNER CONFIGURATIONS

STATEMENT OF FEDERALLY SPONSORED RESEARCH

The U.S. Government has a paid-up license in this invention and the right in limited circumstances to require the patent owner to license others on reasonable terms as provided for the by the terms of Contract No. N00140-96-C-0188, Navy Joining Center Project No. TDL 99-01 awarded by the Office of Naval Research (ONR).

BACKGROUND OF THE INVENTION

1. Field of the Invention

This invention pertains to friction stir welding and more particularly to a backing plate and a friction stir welding probe for making L- and T-type filleted corner joints.

2. Background of the Invention

Friction stir welding is a relatively new welding technique discovered in the mid-1990s that was developed primarily for welding aluminum and soft aluminum alloys that were difficult to weld using traditional welding techniques. The technique uses a rotating shouldered cylindrical tool with a projecting probe (also referred to as a pin) to generate heat in the workpiece. The mechanical friction of the rotating tool contacts the workpiece and plasticizes (softens) the metal as it is plunged into the bondline. At this stage, there is a substantial amount of plasticized metal in a column about the rotating pin beneath the shoulder of the cylinder portion of the tool. The tool is then moved along the bondline relative to the workpiece. As the pin rotates and moves in a transverse direction, the metal is plasticized at the front of the pin and extruded to the back of the pin while undergoing a mechanical stirring and forging action imparted by the pin surface profile and confined from above by the pressure exerted on the material by the shoulder of the cylindrical tool. The plasticized metal is transferred from the front of the pin around the periphery of both sides of the pin and subsequently reconstituted at the back of the pin to produce the weld. The rotational speed and translational travel speed are controlled to maintain a plasticized metal state.

The friction stir weld tool is formed as a cylindrical piece with a shoulder face that meets a probe that projects from the shoulder face at a right angle (U.S. Pat. Nos. 5,460,317 and 6,029,879). In some instances, the probe actually moves in a perpendicular direction in an aperture formed in the face of the shoulder (U.S. Pat. Nos. 5,697,544; 5,718,366; and 5,893,507). The face of the shoulder can be formed with an upward dome that is perpendicular to the probe (U.S. Pat. Nos. 5,611,479; 5,697,544; and 6,053,391). The dome region and an unobstructed dome (shoulder face)/probe interface are considered essential for the proper frictional heating of the workpiece material. The dome region constrains plasticized material for consolidation at the trailing edge of the friction stir tool rather than permitting it to extrude out from under the sides of the tool. The length of the probe is usually designed to be slightly shorter than the thickness of the materials being welded. The bottom (distal end) of the probe is also normally made with a smooth radius. The features on the typically smooth distal end of the probe are usually not considered critical other than to assure that a certain clearance distance from the bottom of the work pieces being welded are maintained for any joint configuration.

Another factor influencing friction stir weld is the configuration of the backing or support plate. The support plate is the "tool" on which the work pieces rest during welding. For butt welds, the work pieces sit on a flat featureless plate that only restricts movement of the plasticized work piece material during welding. For L- and T-type corner joints, backing plates butt directly up against both the horizontal and vertical work pieces so that no material can extrude away from the joint. Welding with this type of joint configuration with the backing plates firmly against the horizontal and vertical members and a standard friction stir welding tool (tapered or straight probe) often produces a crevice at the point where the horizontal and vertical work pieces contact each other because the probe has not properly mixed the plasticized materials. For various applications, this can act as either a notch when the joint is loaded in fatigue or as a source of corrosion by harboring detrimental work piece compositions. To remedy these situations, either a subsequent machining operation is needed to smooth the corner or an additional welding process (such as gas metal arc) is needed to fill the corner in a sealing-type operation.

Accordingly, it is an object of the present invention to provide a friction stir welding setup for corner welds that avoids volumetric defects present after welding.

It is an object of the present invention to avoid subsequent machining operations to smooth the corners of L- and T-type friction stir welds.

It is another object of the present invention to provide a method of friction stir welding L- and T-type corner joints that avoids the production of crevices at the point where the two work pieces meet.

It is another object of the present invention to provide a method of friction stir welding that avoids subsequent additional welding processes to fill the corner of L- and T-type welds.

It is an object of the present invention to produce a filleted L- and T-type corner weld using the friction stir welding process.

It is an object of the present invention to produce a corner support (backing) plate that promotes the production of a filleted L- and T-type corner weld using the friction stir welding process.

It is an object of the present invention to provide a friction stir weld tool that thoroughly mixes plasticized work piece material near the distal end of the probe.

It is an object of the present invention to provide a friction stir weld tool that forms a well mixed plasticized work piece material in the region of a fillet of a L- and T-type corner weld.

SUMMARY OF THE INVENTION

In order to meet these objects, the present invention of a friction stir weld tool features a friction stir welding setup for corner welds that comprises a corner support plate having: 1) a horizontal portion, 2) an angled portion, and 3) a radiused outer corner. A first work piece is secured to the angled portion of the corner support plate while a second work piece is secured to the horizontal corner support plate and in proximity with said first work piece to form a corner void with the radiused outer corner of the corner support plate. A friction stir weld tool is used to join the first work piece to the second work piece in a region where the first work piece and said second work piece are in proximity with each other and to fill the corner void with plasticized first work piece and second work piece material to formed a filleted corner weld.

For an L-type weld, the first work piece extends above the horizontal portion of corner support plate by an amount equal to the thickness of the second work piece and an end of the second work piece butts against the face of the first work piece that extends above the horizontal portion of the corner support plate.

For a T-type weld, the end of the first work piece is substantially flush with the upper surface of the horizontal portion of the corner support plate and the underside of the second work piece butts against the end of the first work piece that is flush with the upper surface of the horizontal portion of the corner support plate. Although in some cases it is desirable to fillet only one side of the T-type weld, typically a second corner support plate with a radius outer corner is used in order to form a fillet on both sides of the T-type weld. The second work piece may be a single unitary piece or made up of two work piece sections in end-to-end proximity relation with each other, i.e., in butt weld relation, and aligned such that the ends are substantially centered over the end of the first work piece.

Preferably for T-weld type welds, the friction stir weld tool tip extends into the end of the first work piece and has a rounded distal end. To ensure complete mixing of plasticized work piece material and filling of the corner void to produce a quality fillet, the friction stir weld tool has a curved tip region that conforms generally to the radius of the outer corner of the corner support plate.

Generally for either L- or T-type welds, the friction stir weld tool has disrupting features such as notches or grooves formed in the distal end of the tool to ensure mixing of plasticized material below the distal end of the tool and force plasticized material into the corner void to form the weld fillet. Two rectangular grooves that are formed in a rounded distal end of the tool probe and cross at right angles are especially effective in carrying out these objectives.

The foregoing and other objects, features and advantages of the invention will become apparent from the following disclosure in which one or more preferred embodiments of the invention are described in detail and illustrated in the accompanying drawings. It is contemplated that variations in size, structural features and probe designs may appear, to a person skilled in the art, without departing from the scope of or sacrificing any of the advantages of the invention.

BRIEF DESCRIPTION OF THE DRAWINGS

FIG. 7 is a plan view of a friction stir welding tool with crossing grooves formed in the rounded distal end.

FIG. 8 is an end view of the distal end of the probe tip illustrating the crossed grooves formed in the rounded distal end of the probe tip.

FIG. 9 is another embodiment of the friction stir welding tool illustrating a second rounded shoulder region in the probe tip region.

FIG. 10 is an end view of the distal end of the probe tip illustrating the crossed grooves formed in the rounded distal end of the probe tip.

FIG. 11 is an end view of the distal end of a probe tip showing notches cut into the rounded distal end of the probe tip.

Figure 1:
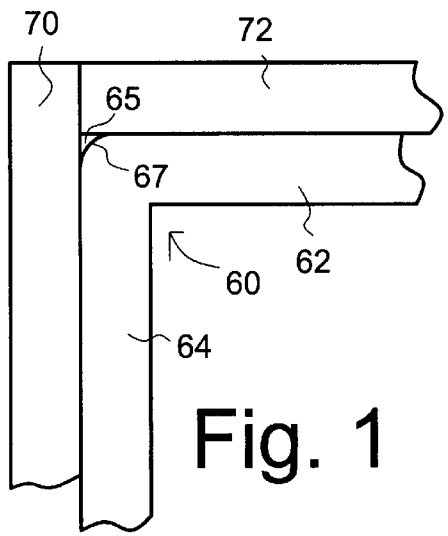
FIG. 1 is a plan view illustrating a set-up for inverted L-type corner welding including a corner support plate with a radiused outer corner.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

As used in this application, the following words have the following meanings. "Corner" refers to a configuration in which a first horizontal member meets a second angled member. Although typically the second angled member meets the horizontal member at a right (90 degree) angle, a wide range of other angles are also contemplated by the term corner. The term "horizontal" is used only for orientational purposes and is in no way limiting, it being realized that any orientation may be selected for the first member and a second member angled to meet the first member in a corner configuration. "Proximity" refers to parts that are either in contract with each other or with a minimum gap between the parts, it being realized the some surface variation in work piece units are possible and that contact is not always possible along the intended contacting region of the work pieces or slight separation may occur during the setup process. However, gaps, especially large gaps are to be avoided as this reduces the thickness (and strength) of the weld.

As shown in FIGS. 1, 2, 4, and 5, the present invention features a corner support plate 60 that comprises 1) a horizontal portion 62, 2) an angled portion 64, and 3) a radiused outer corner 67. The corner support plate 60 is formed of a material melting at a higher temperature than the pieces to be welded. For example, if the pieces to be welded are aluminum then the corner support plate can be made of steel.

Figure 5:
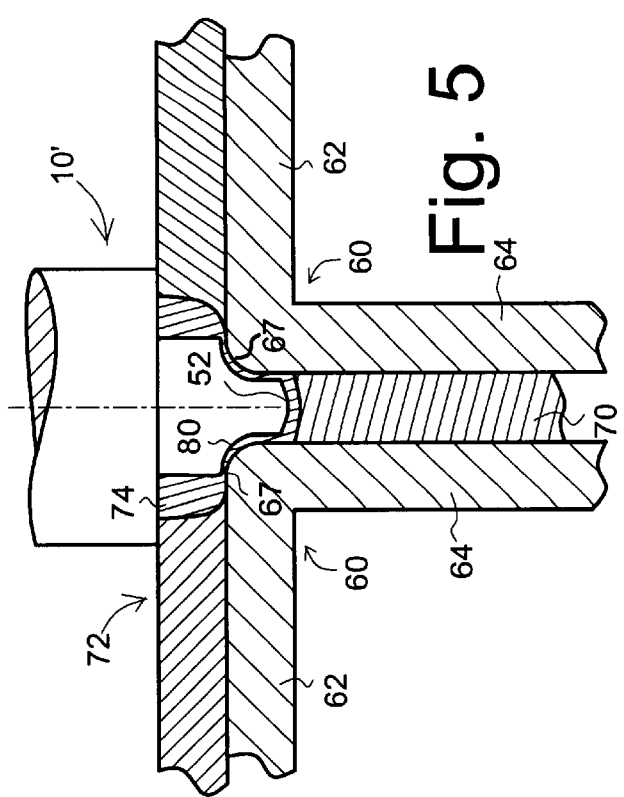
FIG. 5 is a cross-sectional plan view illustrating the position of the friction stir welding tool and plasticized metal during the friction stir weld process and further illustrates a friction stir welding tip region radius that conforms generally to the radiused outer corners of the corner support plates.

A first work piece 70 is secured to the angled portion 64 of the corner support plate 60, typically by clamping. A second work piece 72 is secured to the horizontal corner support plate portion 62 and in proximity with the first work piece 70 to form a corner void 65 with said radiused outer corner 67 of the corner support plate 60. As seen in FIGS. 2 and 5, a friction stir weld tool 10 and 10', respectively, is used to join first work piece 70 to the second work piece 72 in a region where the first work piece 70 and the second work piece 72 are in proximity with each other while filling the corner void 65 (FIGS. 1 and 4) with plasticized first work piece and second work piece material that surrounds the friction stir weld tool 10, 10'.

As seen in FIGS. 7–11, the friction stir welding tool features disrupting features such as notches (FIG. 11) and grooves (FIGS. 7–10) formed in the distal end 52 of the tool 10''', 10'''. These disrupting features have the advantage of more thoroughly mixing the plasticized metal 74 (FIGS. 2 and 5) of the work pieces 70, 72 to afford good fusion of the work pieces 70, 72. These disrupting features also force the plasticized metal 74 into the fillet void 65 (FIGS. 1 and 4) to form the filleted welds 76, 76' shown in FIGS. 3 and 6, respectively. Preferably the distal end (FIGS. 7 and 9) of the friction stir welding tool 10'' and 10''' is a rounded tip 52.

Another feature of the present invention is a curved or radiused tip region 80 formed in the friction stir welding tool 10''' (FIGS. 5 and 9). As shown in FIG. 5, this curved region 80 has a curvature (radius) 82 (FIG. 9) that conforms to the radius of the outer corner 67 of the corner support plate 60. This has the advantage of insuring good mixing of the plasticized work piece material and forcing the plasticized work piece material into the corner void 65 (FIG. 4) to form a strong fillet weld 76' as shown in FIG. 6.

Figure 2:
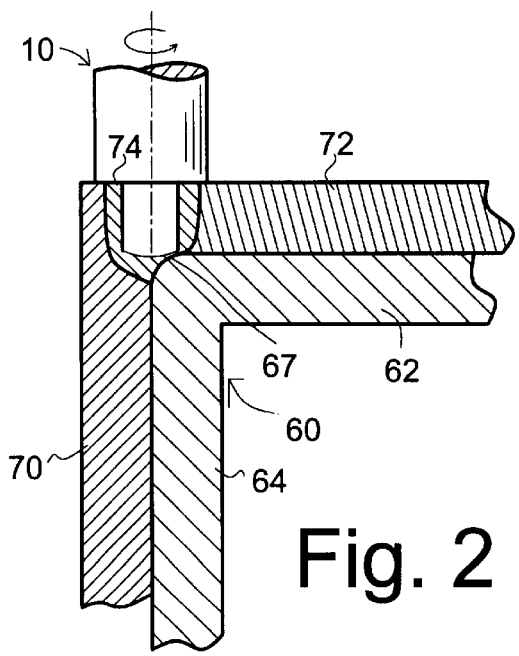
FIG. 2 is a cross-sectional plan view illustrating the position of the friction stir welding tool and plasticized metal during the friction stir weld process. The friction stir welding tool is shown in full view to better illustrate its position during the welding process.
Figure 3:
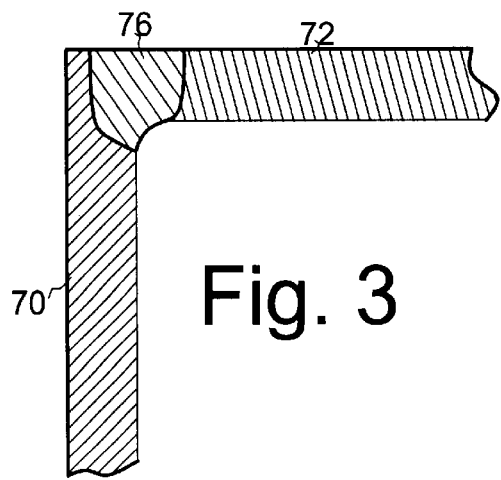
FIG. 3 is a cross-sectional plan view illustrating the resulting inverted L-type fillet corner weld using the radiused corner support plate and friction stir welding tool shown in FIGS. 1 and 2.

FIGS. 1–3 show the setup, welding process, and resulting fillet weld 76 used in L-type corner welds. The first work piece 70 extends above the horizontal portion 62 of the corner support plate 60 by an amount equal to the thickness of the second work piece 72. An end of the second work piece 72 butts against the face of the first work piece which extends above the upper horizontal surface of the corner support plate 60.

Figure 6:
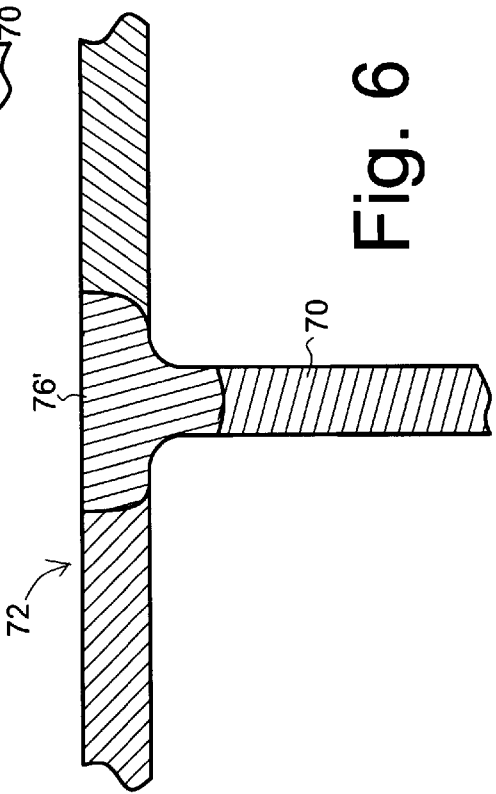
FIG. 6 is a cross-sectional plan view illustrating the resulting fillet T-weld using the radiused corner support plate and friction stir welding tool with radiused tip region shown in FIGS. 4 and 5.
Figure 4:
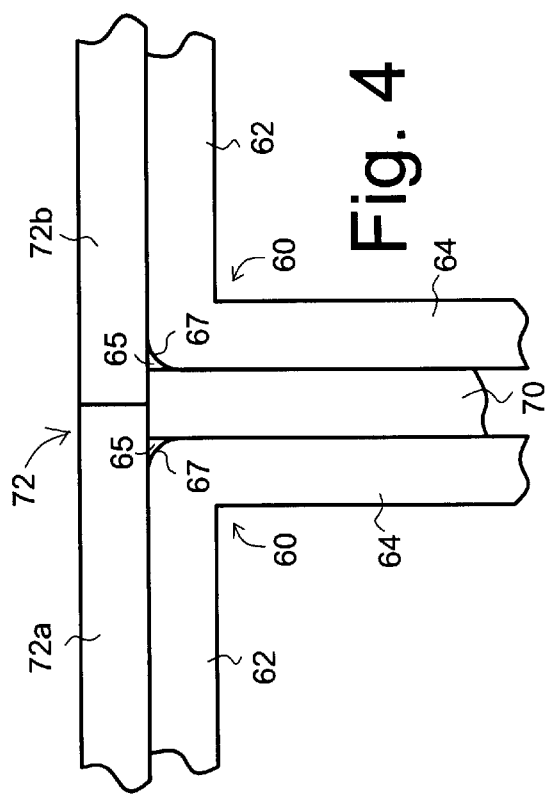
FIG. 4 is a plan view illustrating a set-up for T-type corner welding including the use of corner support plates with radiused outer corners.

FIGS. 4–6 show the setup, welding process, and resulting fillet weld 76' used in T-type corner welds. The end of the first work piece is substantially flush with the upper surface of the horizontal portions 62 of the corner support plates 60. The underside of the second work piece 72 butts against the end of the first work piece and is flush with the upper surface of the horizontal portions 62 of the corner support plates 60.

Although FIGS. 4 and 5 illustrate the use of radiused outer corners on both corner support plates 60, it is to be realized that on some occasions, it may be desirable to use only a single radiused corner support plate 60 while the support plate on the opposite is of conventional design and lacks the radiused outer corner 67. Also it is possible to use a setup as shown in FIG. 4 and use a friction stir welding tool with a smaller diameter. Such a smaller diameter probe is laterally offset toward the side on which the filet is desired leaving the opposite without a fillet.

As shown in FIG. 4, the second work piece 72 comprises two work piece sections 72a, 72b in end-to-end proximity relation with each other (a butt joint relation) such that the ends are substantially centered over the end of the first work piece 70. However, it is to be realized that a single, unitary work piece 72 can be used equally well in the setup of FIG. 4. As shown in FIG. 5, the friction stir weld tool 10' has a rounded distal end 52 that extends into the end of the first work piece 70. As noted above, the friction stir weld tool has a curved tip region 80 that conforms substantially with the radiused outer corner 67 of corner support plate 60. This curved tip region 80 ensures good mixing of the plasticized work piece material and a fully filled corner void 65 (FIG. 4) to produce a high quality weld 76' (FIG. 6).

With reference to FIG. 7, a friction stir welding tool 10'' is shown that comprises a cylinder 30 with a first end 24 for attachment to a rotating drive for rotation about longitudinal axis 26 and a shoulder face 16 opposite first end 24. A probe 14 projects downward at a substantially right angle to the shoulder face 16 and is integral with cylinder 30. Probe 14 has a longitudinal axis that is co-extensive with the cylinder axis 26. The present invention contemplates a wide variety of probe shapes and styles including but not limited to threaded, unthreaded, cylindrical, truncated cone, reverse truncated cone, and bossed probes and various combinations thereof.

A transition geometry region 20 at the intersection of the shoulder face 16 and base 50 of probe 14 has been found to significantly increase the operational life of tool 10''. When combined with other features such as a tapered thread root 48 that increases in depth from near the base 50 to distal end 52 and an increase in tool material strength, the operational life of the tool has been unexpectedly increased by a factor of over fifty times. This has the advantage of allowing the tool to operate at faster speeds or in thicker materials or in harder materials or various combinations of the three and affords cost saving and welding ease not previously possible. Other details, features and advantages of probe design may be found in co-pending U.S. application Ser. No. 10/076, 246, all of which is incorporated by reference as if completely written herein.

Typically the shoulder face 16 is formed with a dome 18 that allows for the proper flow, mixing and forging of plasticized workpiece material while it flows from the front of the probe to the rear as the probe moves in the welding direction.

In addition to the above features, it has been found that modifications in the probe thread structure also improves probe life. One of these modifications consists of reducing the depth of the thread root 48 near the base 50 of the probe 14. That is, the depth of the root 48 increases on going from the probe base region 50 (zero thread root depth) to the distal end of the probe 52 where the root depth is at its maximum, i.e., the ratio of the major diameter of the threads at 22 to the minor diameter of the threads at the bottom of root 44 increases from the probe base 50 to the distal end 52. Additionally, it has been found beneficial to provide the base of the thread with a large root radius, i.e., rounded root 44. These thread features have the advantage of substantially reducing the high-stress concentrations inherent in sharp threads. Such stress reduction is especially critical at the base 50 of the probe 14 where bend fatigue stresses are at a maximum level. The features of an increasing thread root depth toward the distal end 52 of the probe 14 with a large root thread radius encourages proper mixing of the plasticized material by the probe 14, yet is designed for maximum fatigue performance where stresses are highest.

For improved plasticized material mixing at the tip 52 of probe 14, it has been found advantageous to form disrupting features in the distal end 52 to increase the flow of plasticized metal in the region at the end of distal end 52. As shown in FIGS. 7–10, grooves are formed in rounded distal end 52. Preferably two rectangular shaped groves 56 that cross at essentially right angles to each other are used.

Another embodiment of the friction stir welding tool 10''' is illustrated in FIGS. 9 and 10. Unlike the embodiment in FIGS. 7 and 8, this tool is illustrated with an unthreaded probe. In addition to the transition geometry 20 at the base of probe 14, the embodiment features a second shoulder region 84 and a curved tip region 80. The curved tip region 80 is especially useful in ensuring that the corner void 65 (FIG. 4) is well stirred and completely filled to produce a strong fillet weld 76' (FIG. 6). As seen in FIG. 5, tool 10' is selected with a curved region 80 that conforms substantially with the curvature of the radiused outer corner 67 of the corner support plate 60. As with the tool embodiment 10" shown in FIGS. 7 and 8, tool 10''' (FIGS. 9 and 10) also used disruptive features such as two rectangular grooves crossing at right angles and formed in the rounded distal end 52 of the probe to promote plasticized material mixing beneath probe tip 52.

It is possible that changes in configurations to other than those described and illustrated could be used but that which is shown is preferred and typical. Without departing from the spirit of this invention, various other probe geometries and backing plate configurations may be used.

It is therefore understood that although the present invention has been specifically disclosed with the preferred embodiment and examples, modifications to the design concerning sizing, shape, of probe and backing plate features or lack thereof will be apparent to those skilled in the art and such modifications and variations are considered to be equivalent to and within the scope of the disclosed invention and the appended claims.

What is claimed is:

1. A friction stir welding setup for corner welds comprising:
   a) a corner support plate comprising:
      1) a horizontal portion;
      2) an angled portion;
      3) a radiused outer corner;
   b) a first work piece secured to said angled portion of said corner support plate;
   c) a second work piece secured to said horizontal corner support plate and in proximity with said first work piece and forming a corner void with said radiused outer corner of said corner support plate;
   d) a friction stir weld tool for joining said first work piece to said second work piece in a region where said first work piece and said second work piece are in proximity with each other and filling said corner void with plasticized first work piece and second work piece material.

2. The friction stir welding setup for corner welds according to claim 1 wherein:
   a) said first work piece extends above the horizontal portion of said corner support plate by an amount equal to the thickness of said second work piece; and
   b) an end of the second work piece butts against the face of said first work piece extending above said horizontal portion of said corner support plate.

3. The friction stir welding setup for corner welds according to claim 1 wherein:
   a) an end of said first work piece is substantially flush with the upper surface of said horizontal portion of said corner support plate; and
   b) the underside of said second work piece butts against said end of said first work piece flush with said upper surface of said horizontal portion of said corner support plate.

4. The friction stir welding setup for corner welds according to claim 3 further comprising:
   a) a second corner support plate comprising:
      1) a horizontal portion;
      2) an angled portion; and
      3) a radiused outer corner;
   b) said first work piece secured to said angled portion of said second corner support plate on the side of said first work piece opposite said other corner support plate so that the upper surface of said horizontal portion of said second corner support plate is substantially flush with said end of said first work piece.

5. The friction stir welding setup for corner welds according to claim 4 wherein said second work piece comprises two work piece sections in end-to-end proximity relation with each other such that the ends are substantially centered over the end of the first work piece.

6. The friction stir welding setup for corner welds according to claim 4 wherein said friction stir weld tool has a rounded distal end that extends into the end of said first work piece.

7. The friction stir welding setup for corner welds according to claim 4 wherein said friction stir weld tool has a curved end region that extends into the end of said first work piece.

8. The friction stir welding setup for corner welds according to claim 7 wherein said curved end region has a curvature that conforms to the curvature of said outer corner of said corner support plate.

9. The friction stir welding setup for corner welds according to claim 1 with said friction stir weld tool comprising disrupting features formed in the distal end of said tool.

10. The friction stir weld tool according to claim 9 wherein said disrupting features comprise notches formed in said distal end.

11. The friction stir weld tool according to claim 9 wherein said disrupting features comprise grooves formed in said distal end.

12. The friction stir weld tool according to claim 11 wherein two grooves are formed in said distal end.

13. The friction stir weld tool according to claim 12 wherein said two grooves cross at substantially right angles to each other.

14. The friction stir weld tool according to claim 13 wherein said two grooves are rectangular grooves.

15. The friction stir weld tool according to claim 14 wherein said distal end is a rounded end.

16. A friction stir weld tool for joining work pieces at a corner comprising:
   a) a cylinder having:
      1) a first end portion for attachment to a rotating drive;
      2) a second opposite end probe portion with a distal end;
   b) said second opposite end probe portion having formed in said distal end disrupting features that increase the flow of plasticized metal in the region at the end of said distal end, wherein said disrupting features comprise two rectangular grooves that cross at essentially right angles to each other.

17. The friction stir weld tool according to claim 16 wherein said distal end is a rounded end.

18. A method for producing corner welds using friction stir welding, said method comprising the steps of:
   a) providing a corner support plate comprising:
      1) a horizontal portion;
      2) an angled portion;
      3) a radiused outer corner;
   b) securing a first work piece to said angled portion of said corner support plate;

c) securing a second work piece to said horizontal corner support plate and in proximity with said first work piece so as to form a corner void with said radiused outer corner of said corner support plate;

d) plasticizing said first work piece and said second work piece in a region where said first work piece and said second work piece are in proximity with each other so as to fill said corner void with plasticized first work piece and second work piece material with a friction stir weld tool; and e) removing said corner support plate from said first work piece and said second work piece to provide a fillet corner weld.

19. The method for producing corner welds using friction stir welding according to claim 18 further comprising the steps of:

a) positioning said first work piece so that it extends above the horizontal portion of said corner support plate by an amount equal to the thickness of said second work piece; and b) positioning an end of the second work piece against the face of said first work piece extending above said horizontal portion of said corner support plate.

20. The method for producing corner welds using friction stir welding according to claim 18 further comprising the steps of:

a) positioning an end of said first work piece so that it is substantially flush with the upper surface of said horizontal portion of said corner support plate; and b) positioning the underside of said second work piece so that it is against said end of said first work piece.

21. The method for producing corner welds using friction stir welding according to claim 20 further comprising the steps of:

a) providing a second corner support plate comprising:
  1) a horizontal portion;
  2) an angled portion; and
  3) a radiused outer corner;

b) securing said first work piece to said angled portion of said second corner support plate on the side of said first work piece opposite said other corner support plate so that the upper surface of said horizontal portion of said second corner support plate is substantially flush with said end of said first work piece.

22. The method for producing corner welds using friction stir welding according to claim 21 further comprising the step of providing a rounded distal end on said friction stir weld tool that extends into the end of said first work piece.

23. The method for producing corner welds using friction stir welding according to claim 21 further comprising the step of providing a curved tip region on said friction stir weld tool that extends into the end of said first work piece.

24. The method for producing corner welds using friction stir welding according to claim 23 wherein said curved tip region has a curvature that conforms to the curvature of said outer corner of said corner support plate.

25. The method for producing corner welds using friction stir welding according to claim 18 further comprising the step of forming two rectangular grooves crossing at right angles to each other in the distal end of said friction stir welding tool.

26. A friction stir weld tool for joining work pieces at a corner comprising:

a) a cylinder having:
  1) a first end portion for attachment to a rotating drive;
  2) a second opposite end probe portion with a rounded distal end further comprising disrupting features that increase the flow of plasticized metal in the region beyond said distal end, wherein said disrupting features comprise two rectangular grooves formed in said distal end that cross at essentially right angles to each other;

b) said second opposite end probe portion having formed therein a curved tip region, said curved tip region having a shoulder and a curved transition geometry for reducing the distal end region of said probe to a smaller probe diameter.

* * * * *